United States Patent [19]

Majewski

[11] Patent Number: 5,221,389
[45] Date of Patent: Jun. 22, 1993

[54] ADJUSTABLE CARRIER AND METHOD FOR PROCESSING A TIRE IN A TIRE RETREADING PLANT

[75] Inventor: Robert H. Majewski, Findlay, Ohio

[73] Assignee: Hercules Tire & Rubber Company, Findlay, Ohio

[21] Appl. No.: 785,864

[22] Filed: Oct. 28, 1991

Related U.S. Application Data

[63] Continuation of Ser. No. 511,186, Apr. 19, 1990.

[51] Int. Cl.⁵ ................. B65G 17/32; B60C 25/00
[52] U.S. Cl. ................. 156/96; 198/473.1; 198/487.1; 198/682; 198/803.12; 211/23; 211/117
[58] Field of Search ............ 156/909, 406.2, 396, 156/96, 111; 198/465.4, 486.1, 487.1, 473.1, 682, 803.12; 248/297.5, 297.3, 295.1; 414/426, 377, 381; 211/23, 24, 117, 208, 193

[56] References Cited

U.S. PATENT DOCUMENTS

| | | | |
|---|---|---|---|
| 639,549 | 12/1899 | Fitzgerald | 211/117 |
| 1,612,655 | 12/1926 | Rudin | 248/297.3 |
| 1,762,304 | 6/1930 | Morgan . | |
| 1,826,412 | 10/1931 | Bennett et al. . | |
| 1,907,894 | 5/1933 | Stevens et al. . | |
| 2,237,160 | 4/1941 | O'Malley . | |
| 2,343,490 | 3/1944 | White | 211/117 |
| 2,351,990 | 6/1944 | Matlock . | |
| 2,677,521 | 5/1954 | Willingham | 248/297.3 |
| 2,796,974 | 6/1957 | Weinberger . | |
| 2,957,590 | 10/1960 | Armiger | 211/117 |
| 3,011,650 | 12/1961 | Engelhorn | 211/117 |
| 3,129,820 | 4/1964 | Stulman | 211/117 |
| 3,392,945 | 7/1968 | Graham . | |
| 3,547,714 | 12/1970 | Freeman | 198/353 |
| 3,696,939 | 10/1972 | Drowatzky | 211/117 |
| 4,037,727 | 7/1977 | Kunkle | 211/117 |
| 4,250,647 | 2/1981 | Woodard | 248/297.3 |
| 4,902,380 | 2/1990 | Olson | 156/909 |

FOREIGN PATENT DOCUMENTS

WO84/00349  2/1984  PCT Int'l Appl. .

Primary Examiner—Michael W. Ball
Assistant Examiner—Daniel J. Stemmer
Attorney, Agent, or Firm—Pearne, Gordon, McCoy & Granger

[57] ABSTRACT

A movable, adjustable carrier assembly suitable for transporting a tire through a tire retreading plant along a conveyor track at different heights. The adjustable carrier assembly includes a main bar and a support bar. The support bar self-lockingly engages one of a plurality of notches or slots in the main bar. By reason of the multiplicity of notches, the height of the support bar, and accordingly the height of the tire it is transporting, can be adjusted, thus permitting a tire to be transported throughout a tire retreading plant on a single adjustable carrier, the height of the tire being adjusted as needed at the various operational stations. Also, the same adjustable carrier can be adjusted to accommodate tires of different sizes.

3 Claims, 2 Drawing Sheets

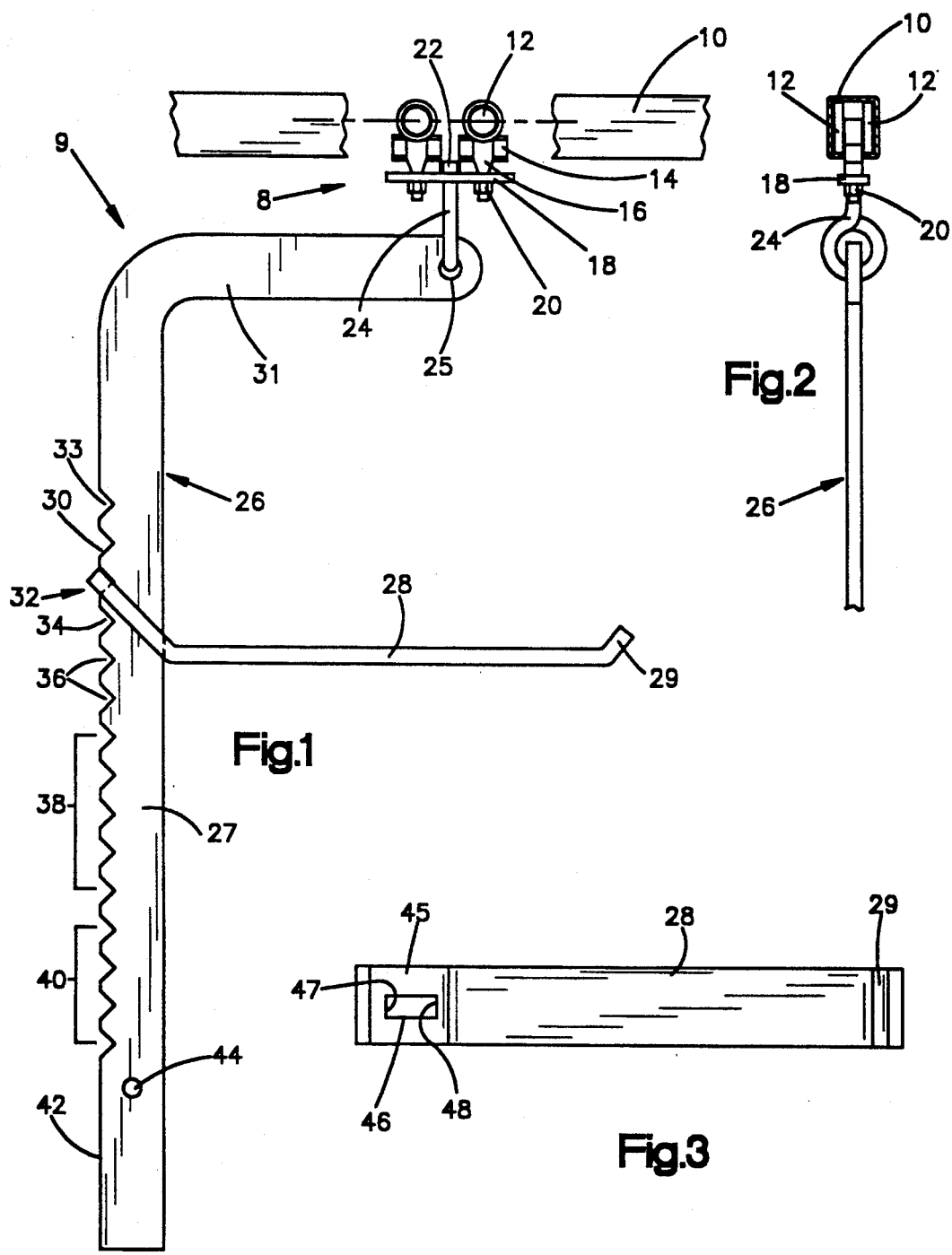

ADJUSTABLE CARRIER AND METHOD FOR PROCESSING A TIRE IN A TIRE RETREADING PLANT

This is a continuation of application Ser. No. 07/511,186, filed Apr. 19, 1990.

BACKGROUND OF THE INVENTION

The present invention relates in general to adjustable conveyor carriers, and, in particular, to an adjustable conveyor carrier and its use in processing a tire in a tire retreading plant.

DESCRIPTION OF RELATED ART

In a tire retreading plant of the prior art, a tire is moved to various operational stations in the plant by means of a carrier mounted in a manual, continuous carrier system. The prior art utilizes a non-adjustable carrier called a "J-hook", which is shaped more like a C than a J. The problem with the use of a non-adjustable J-hook is that a single size hook cannot properly accommodate the various sizes of tires which are processed through a tire retreading plant, and cannot reasonably allow for the face that different machines performing different operations in the plant can require the tire to be held at different heights. Consequently, a variety of lengths of J-hooks must be used in a conventional plant.

It is also known to use a chain as the operative element of the carrier device at a single station. The chain can be adjusted in length by attaching a different link to a hook on the carrier, which as the effect of raising or lowering the height of the tire being carried by the chain carrier. However, the chain carrier is difficult to handle and adjust, and completely encircles the tire being carried, making it difficult and time-consuming to load or remove a tire from the chain carrier.

SUMMARY OF THE INVENTION

The present invention provides a conveying system with an adjustable carrier which overcomes the problems of the prior art. The adjustable carrier comprises a depending main bar having a plurality of adjustment notches or slots and a support bar having an aperture at one end. The depending main bar extends through the aperture so that the support bar is self-lockingly engageable with the depending main bar in any selected one of the adjustment notches. The adjustable carrier is suspended from a continuous or endless conveyor track by suspending means. The suspending means is movable along the continuous conveyor track. The continuous conveyor track runs throughout the tire retreading plant, so that a tire can be mounted on an adjustable carrier of the present invention and can be moved to different stations in the plant where operations may be performed on the tire. Since the carrier is adjustable by way of the support bar being repositioned in a different adjustment notch, the height of the tire at each station can be adjusted as necessary. In addition, the same carrier can be used to carry different size tires, again due to its adjustable nature. Thus, a single carrier can be used to carry a range of tire sizes through the whole plant.

The adjustable carrier of the present invention has an advantage over the chain carrier in that it does not encircle the tire, thus making it easier to load and unload the tire from the carrier.

These and other aspects of the invention are illustrated in the accompanying drawings, and are more fully described in the following specification.

BRIEF DESCRIPTION OF THE DRAWINGS

FIG. 1 is a side elevational view of a movable, adjustable carrier assembly according to the present invention;

FIG. 2 is an end elevational view of the top portion of the assembly illustrated in FIG. 1;

FIG. 3 is a top view of the support bar utilized in the adjustable carrier of the present invention.

DESCRIPTION OF THE PREFERRED EMBODIMENT

Figure 4:
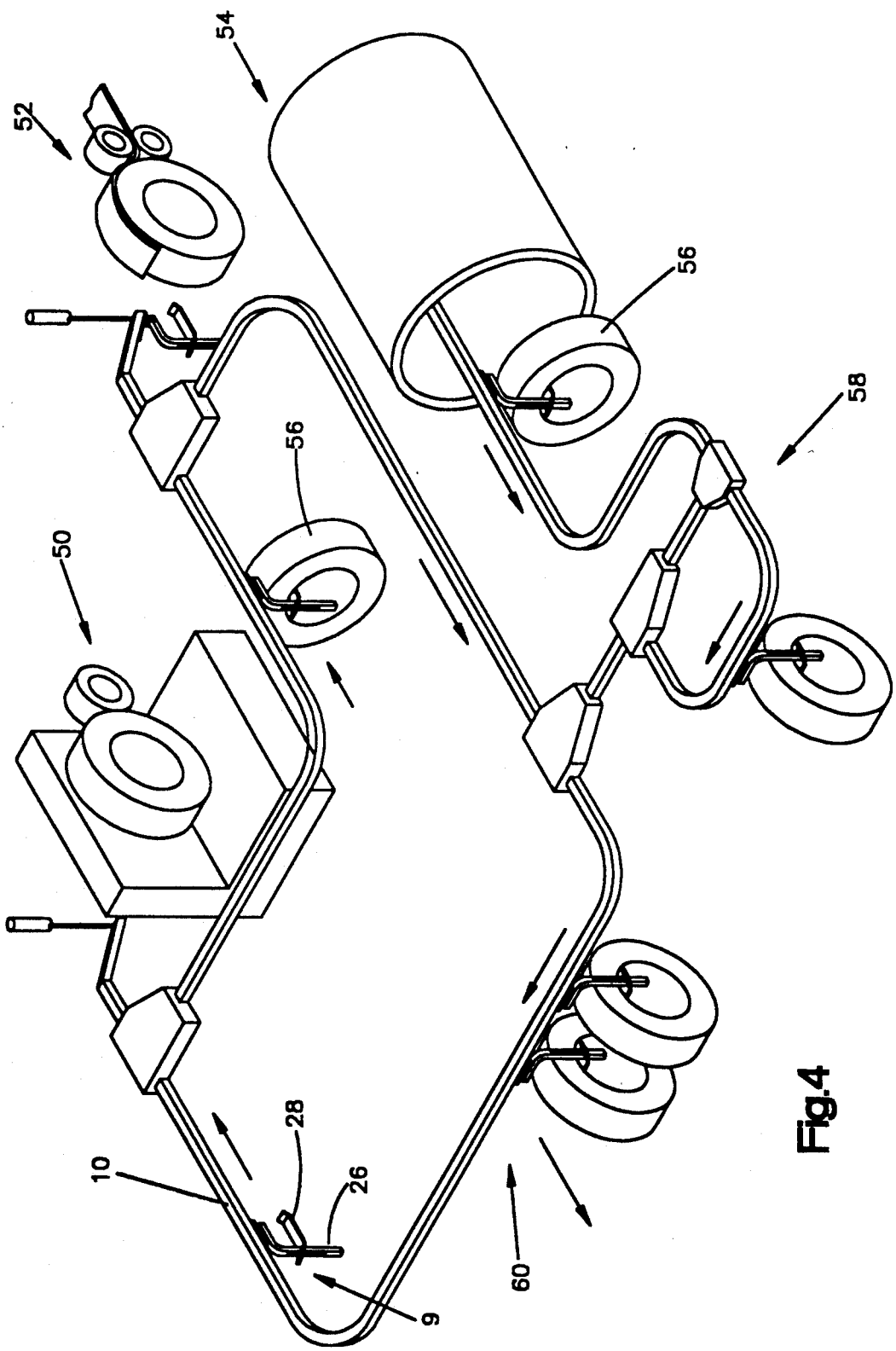
FIG. 4 is a schematic view in perspective of a conveyor system in a tire retreading plant.

A movable, adjustable carrier assembly of the present invention is shown generally in FIGS. 1 and 2. The movable, adjustable carrier assembly includes an adjustable carrier 9 and wheeled carriage means 8, known in the art, for suspending the adjustable carrier from a conveyor track 10. The adjustable carrier 9 comprises a depending rigid main bar 26 and a transverse rigid support bar or arm 28. In the preferred embodiment, the main bar 26 is L-shaped and includes a generally vertical portion 27 and a generally horizontal portion 31 integral therewith. The generally horizontal portion 31 has a mounting hole 25 near its end.

The main bar 26 is generally rectangular in cross section and has a plurality of notches or slots 30, 32, 33, 34, 36, 38, and 40 along the outer edge of its generally vertical portion 27. A split pin 44 is fixed in a hole near the bottom of the generally vertical portion 27 of the main bar 26. The split pin 44, having a length greater than the thickness of the main bar 26 so as to locally increase the effective thickness of the main bar in this region, keeps or prevents the support bar 28 from falling off the main bar 26.

The generally vertical portion 27 of the main bar 26 extends below the split pin 44 to form a hand grip 42. An operator can grasp the hand grip 42 and move or reorient the adjustable carrier or pull or push the movable, adjustable carrier assembly along the conveyor track.

With reference to FIG. 3, the support bar 28 has a self-locking end 45 bent upwardly at an angle to the main length of the support bar and a restraining tip 29, also bent upwardly at an angle to the main length of the support bar, and both integral with the support bar. The support bar 28 has an aperture 46 through the self-locking end 45. The aperture 46 has an inner surface 48 and an outer surface 47. The generally vertical portion 27 of the main bar 26 extends through the aperture 46. Accordingly, the distance between the inner surface 48 and the outer surface 47 of the aperture 46 must be at least as wide as the major width (shown in the plane of the drawing) of the generally vertical portion 27 of the main bar 26.

When gravity acts upon the support bar 28, the outer surface 47 of the aperture 46 will engage a notch and the inner surface 48 of the aperture 46 will press against the edge of the main bar opposite the notches, locking the support bar 28 into the main bar 26 in a generally horizontal, self-locking engagement. When a tire is placed upon the support bar, the weight of the tire will cause the support bar to be even more tightly self-lockingly engaged to the main bar. The restraining tip 29 of the support bar 28 helps to prevent the tire from sliding off the support bar.

Means 8 for suspending are utilized to suspend the adjustable carrier 9 from the conveyor track 10. The suspending means 8 comprises wheels 12 attached to vertical supports 16. A guide 14 is attached to the vertical support 16 to help guide the suspending means along the conveyor track 10. A horizontal bracket 18 joins the vertical supports. Nuts 20 secure the vertical supports 16 to the horizontal bracket 18. A non-locking nut 22 secures an eye bolt 24 to the horizontal bracket 18. The eye bolt 24 is free to rotate about its vertical axis. The eye bolt passes through the hole 25 near the end of the generally horizontal portion 31 of the main bar 26, thus suspending the adjustable carrier 9 from the conveyor track 10. The use of a freely rotating eye bolt permits the adjustable carrier to rotate freely in any direction.

As a result of the main bar 26 being L-shaped and the eye bolt engaging the generally horizontal portion of the main bar near its end at hole 25, when a tire is mounted in the adjustable carrier 9, the tire will be generally balanced and centered beneath the eye bolt.

In the preferred embodiment, the suspending means 8 is not covered to a power track; it is manually movable along the conveyor track 10, thus permitting the adjustable carrier with its tire to be moved throughout the retreading plant. There are other means for suspending well known in the art which can be employed to suitably suspend the adjustable carrier 9 of the present invention from a conveyor track; the invention is not limited to a particular type of suspending means or conveyor track. The present invention will operate with any type of monorail or conveyance system, power or free, known in the art.

FIG. 4 illustrates a method for processing a tire in a retreading plant. An adjustable carrier 9 comprising a depending main bar 26 in self-locking engagement with a support bar 28 is suspended, i.e., hangs downwardly, from a continuous or endless conveyor track 10 that extends continuously between each processing station. A tire to be retreaded is mounted on the support bar and the adjustable carrier is manually moved and guided along the conveyor track to a first operational station, such as a buffer 50. At the buffer, the old tread is removed from the tire. The tire 56 is then conveyed on its adjustable carrier to an enveloper 52, where a new tread is applied to the tire. The tire is then conveyed on its adjustable carrier to a curing oven 54, or other ovens (not shown), where the adhesive binding the new tread to the tire is cured. Tires can be temporarily held in the holding rack 58. After curing, the tire on its adjustable carrier is conveyed along the conveyor track and can be removed from its adjustable carrier at any suitable place, such as near the portion of the conveyor track indicated by numeral 60. The adjustable carrier is now ready to receive another tire and to repeat the cycle.

By utilizing the adjustable carrier of the present invention, a single carrier can be utilized to carry the same tire through all the operations and stations of a tire retreading plant. When a tire is in process, such as at the buffer 50, it must be held somewhat lower and, accordingly, the support bar 28 is engaged in one of the in-process notches 40. At the enveloper 52, the tire must be held somewhat higher, so the support bar is adjusted into one of the enveloper notches 38. To adjust the support bar, the end of the support bar opposite the self-locking end 45 is raised, thus disengaging the portion surrounding the aperture 46 from the notch. The support bar is then raised or lowered by a sliding action along an axis defined by the generally vertical portion 27 to the main bar 26 to another notch. The end of the support bar opposite the self-locking end 45 is then lowered until the support bar is again generally horizontal and the portion of the support bar surrounding the aperture has again self-lockingly engaged the main bar at a notch. No tools are needed to perform this adjustment.

When the tire is carried to the curing oven 54, the tire must be raised somewhat more than at the other stations. If the tire being cured is a light commercial tire, the support bar is raised to one of the light commercial notches 36; if it is a 19.5 inch tire, the support bar is raised to the 19.5 notch 34 for curing. If the tire is a 20 or 22.5 inch tire, the support bar is raised to the 20/22.5 notch 32 for curing. If the tire is a 24.5 inch tire, the support bar is raised to the 24.5 notch 30 for curing.

A future size notch 33 has been provided to accommodate a future, larger size tire. Notches in addition to those illustrated can be added and illustrated notches can be repositioned to accommodate other or different tire sizes or different conditions or situations in a particular retreading plant. Likewise, the main bar 26 can be lengthened or reconfigured or reshaped to accommodate additional notches or to carry different size tires or to more easily carry a tire or to carry a tire in a different relative orientation or position, or for other reasons to permit ease of use in a tire retreading plant.

The adjustable carrier 9 can be made from various materials, including steel, aluminum, plastics, brass, titanium, other metals, and kevlar. The adjustable carrier 9 is versatile enough to allow a tire to be processed in its entirety without switching carriers, including through the curing operation, whether in a pre-cure chamber or in a mold-type cure chamber. The adjustable carrier can be used with or without the rim and tube system or any other system currently utilized or anticipated in the future.

The above discussion shows the use of notches on the outer edge of the generally vertical portion 27 of the main bar 26 to adjust the height of the support bar 28, but the present invention also contemplates and covers the use of inside or outside slots or notches with or without rests to accomplish the self-locking engagement.

The foregoing has set forth preferred and illustrative embodiments of the present invention, but various modifications, replacements, and rearrangements of the parts in addition to those described may be effected without departing from the scope of the invention.

What is claimed is:

1. A method for processing a tire in a retreading plant, comprising the steps of:
  (a) positioning a movable, vertically adjustable support bar on a suspending means, said suspending means engaging a conveyor track and being movable therealong, said suspending means including a main bar, said main bar providing receiving means which are engageable with said support bar to releasably mount said support bar on said main bar, said support bar providing an aperture for slidably receiving said main bar;
  (b) mounting a tire on an outwardly extending arm provided by said support bar;
  (c) moving said support bar with the tire along the conveyor track to a station where an operation may be performed on the tire;

(d) lifting the tire off the arm;
(e) raising the arm arcuately to disengage the support bar from the receiving means;
(f) sliding said support bar along said main bar to a desired location;
(g) lowering the arm in an arcuate direction thereby reengaging said support bar with support bar on said main bar;
(h) replacing the tire on said support bar, the weight of the tire causing said support bar to more firmly engage said receiving means; and,
(i) move said support bar with the tire along the conveyor track to a different station where another operation may be performed on the tire.

2. A method for processing a tire in a retreading plant according to claim 1, wherein the step of disengaging the support bar from the receiving means further comprises the step of:
 (a) applying upward force on said arm sufficient to disengage the support bar from the main bar.

3. A method for processing a tire in a retreading plant according to claim 1, where the step of moving the support bar and tire along the conveyor further comprises the steps of:
 (a) manually grasping a portion of said main bar; and,
 (b) exerting force on said main bar to transport said support means, suspending means and tire along the conveyor track.

* * * * *

UNITED STATES PATENT AND TRADEMARK OFFICE
CERTIFICATE OF CORRECTION

PATENT NO. : 5,221,389

DATED : June 22, 1993

INVENTOR(S) : Robert H. Majewski

It is certified that error appears in the above-identified patent and that said Letters Patent is hereby corrected as shown below:

Title page, item [56], under U.S. Patent Documents, Column 2, line 1, "211/117" should be --211/208--.

Column 1, line 11, "carriers," should be --carriers--.

Column 1, line 20, "carrier system" should be --conveyor system--.

Column 1, line 33, "as" should be --has--.

Column 3, line 24, "covered" should be --connected--.

Column 5, line 1, after "off" insert --of--.

Signed and Sealed this

Twenty-sixth Day of April, 1994

Attest:

BRUCE LEHMAN

*Attesting Officer*  *Commissioner of Patents and Trademarks*